(12) United States Patent
Zarkesh et al.

(10) Patent No.: US 6,212,665 B1
(45) Date of Patent: *Apr. 3, 2001

(54) EFFICIENT POWER ANALYSIS METHOD FOR LOGIC CELLS WITH MANY OUTPUT SWITCHINGS

(75) Inventors: Amir M. Zarkesh, Tarzana; Haizhou Chen, Goleta, both of CA (US)

(73) Assignee: Synopsys, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,681

(22) Filed: Mar. 27, 1998

(51) Int. Cl.$^7$ ..................................................... G06F 15/00
(52) U.S. Cl. .................................................. 716/4; 703/14
(58) Field of Search ........................ 395/500.35; 703/14

(56) References Cited

U.S. PATENT DOCUMENTS

| | | | |
|---|---|---|---|
| 4,045,736 | 8/1977 | Carpenter et al. | 324/158 |
| 4,736,338 | 4/1988 | Saxe et al. | 364/900 |

(List continued on next page.)

FOREIGN PATENT DOCUMENTS

| | | | |
|---|---|---|---|
| 95/26000 | 9/1995 | (WO) | G06F/9/455 |

OTHER PUBLICATIONS

"Advanced Library Format for ASIC Cells & Blocks", Oct. 14, 1997, Advanced Library Format (ALF) Reference Manual, Version 0.9.

Zarkesh, et al., "On–Chip Power Evaluation Methods and Issues". Design SuperCon97, On–Chip System Design Session.

*Primary Examiner*—Matthew Smith
*Assistant Examiner*—Thuan Do
(74) *Attorney, Agent, or Firm*—Thelen Reid & Priest LLP; David B. Ritchie

(57) ABSTRACT

The present invention evaluates the power dissipation of an electronic circuit. A power dissipation value is calculated for each transition or event generated during the electronic simulation of an electronic circuit design that corresponds to an actual electronic circuit. The present invention relies on data that includes an electronic circuit design description of the electronic circuit, such as a gate level netlist; a cell library having a power model corresponding to a cell instance; cell activity data such as net transitions; and the total effective load seen by each cell pin of the logic cell to be evaluated for power. The power model includes simple arcs (transition delay values, energy per arc values, cell input capacitances, and output slew rate values) and power evaluation data. The total energy dissipated by the cell during the modeled activity is calculated by determining the number of simple arcs applicable to the cell, attributing an energy dissipated for each arc, adding the energy values, and compensating for any double counting of short circuit and internal charge/discharge energy. Two fix-width queues are used by system as directed by the software code in the power evaluation tool. A queue may be defined in memory under program control but may be of any structure either in software or hardware. For each cell instance, power evaluation tool uses a first queue to track every transition and direction of the transition that occurs at an input pin, while a second queue is used to track every transition and direction of the transition that occurs at a boundary pin (i.e., an input pin or at an output pin). A power value for the cell instance may then also be obtained from the total energy dissipated during the modeled activity.

50 Claims, 7 Drawing Sheets

U.S. PATENT DOCUMENTS

| | | | |
|---|---|---|---|
| 5,039,602 | 8/1991 | Merrill et al. | 437/8 |
| 5,051,938 | 9/1991 | Hyduke | 364/578 |
| 5,101,153 | 3/1992 | Morong | 324/158 |
| 5,157,668 | 10/1992 | Buenzli et al. | 371/15.1 |
| 5,283,518 | 2/1994 | King et al. | 324/158 |
| 5,313,398 | 5/1994 | Rohrer et al. | 364/468 |
| 5,394,121 | 2/1995 | Cipolla et al. | 333/124 |
| 5,446,676 | 8/1995 | Huang | 364/578 |
| 5,473,548 | 12/1995 | Omori et al. | 364/489 |
| 5,481,469 | 1/1996 | Brasen et al. | 364/483 |
| 5,493,507 | 2/1996 | Shinde et al. | 364/489 |
| 5,546,562 * | 8/1996 | Patel | 713/14 |
| 5,553,008 | 9/1996 | Huang et al. | 500/304 |
| 5,610,833 | 3/1997 | Chang | 533/408 |
| 5,623,418 | 4/1997 | Rostoker et al. | 364/489 |
| 5,625,578 | 4/1997 | Du Cloux et al. | 364/578 |
| 5,625,803 | 4/1997 | McNelly et al. | 395/500 |
| 5,805,459 * | 9/1998 | Kapoor | 395/500.35 |
| 5,838,947 * | 11/1998 | Sarin | 395/500.37 |
| 5,910,898 | 6/1999 | Johannsen | 364/489 |
| 5,974,437 | 10/1999 | Johannsen | 708/630 |

* cited by examiner

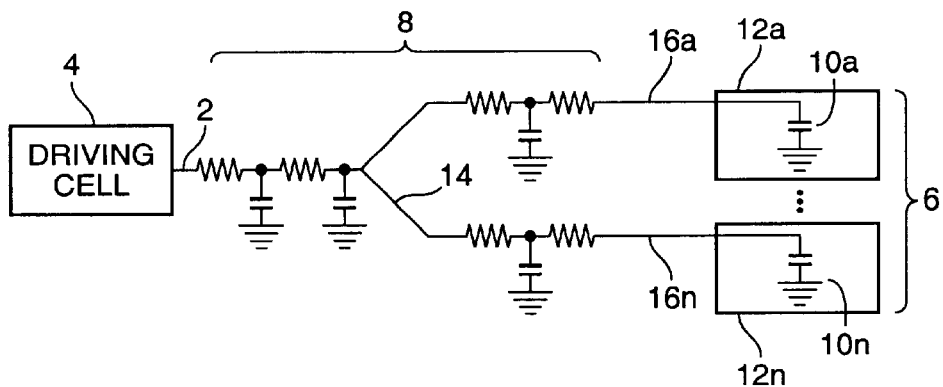
FIG. 1
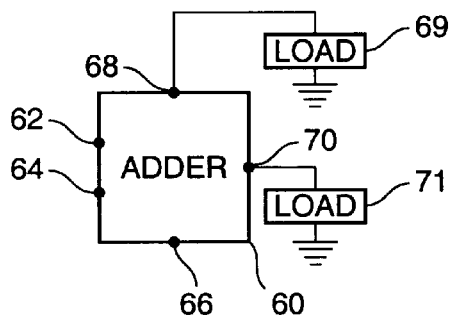
FIG. 2A
| INPUTS | OUTPUTS |
|--------|---------|
| X Y Z  | C S     |
| 0 0 0  | 0 0     |
| 0 0 1  | 0 1     |
| 0 1 0  | 0 1     |
| 0 1 1  | 1 0     |
| 1 0 0  | 0 1     |
| 1 0 1  | 1 0     |
| 1 1 0  | 1 0     |
| 1 1 1  | 1 1     |
FIG. 2B

121 POWER MODEL

134 ENERGY PER ARC TABLE

| SIMPLE ARC | INPUT SLEW RATE | OUTPUT LOAD | ENERGY/ TRANSITION | |
|---|---|---|---|---|
| arc 1 | +2 ns | 2 pf | .005 picojoules | |
| ⋮ | ⋮ | ⋮ | ⋮ | |
| arc n | +1 ns | 1 pf | .0045 picojoules | |
| 122 | 124 | 128 | 130 | 132 |

*FIG. 3B*

200 — GENERATE INPUT INFORMATION

202 — GENERATE A STREAM OF NEW TRANSITIONS (A)

(B)

204 — RECEIVE EACH NEW TRANSITION AND PROVIDE TWO QUEUES FOR SEPARATELY TRACKING TWO TYPES OF TRANSITIONS AND THEIR RESPECTIVE DIRECTIONS FOR EACH CELL INSTANCE

206 — IF THE NEW TRANSITION IS AN INPUT, STORE IT AND ITS DIRECTION IN BOTH THE FIRST AND SECOND QUEUE. IF THE NEW TRANSITION IS AN OUTPUT, ONLY STORE THE NEW TRANSITION AND ITS DIRECTION IN THE SECOND QUEUE

208 — CALCULATE AN ENERGY VALUE FOR AN ARC ATTRIBUTABLE TO EACH NEW TRANSITION (C)

*FIG. 4A*

EFFICIENT POWER ANALYSIS METHOD FOR LOGIC CELLS WITH MANY OUTPUT SWITCHINGS

BACKGROUND OF THE INVENTION

1. Field of the Invention

The present invention relates to power evaluation of an electronic circuit design. More particularly, the present invention relates to a power evaluation system and a power evaluation tool that use simple arcs for calculating the power dissipation of an electronic circuit design under simulation.

2. Background

Power evaluation of integrated circuits (ICs), such as calculating on-chip power dissipation of logic circuits, has become more important, in part, due to the growing number of mobile products and the need to determine "hot spots" on ICs early in the design stage. Also, power evaluation has become much more complex since the increases in die size, speed (even though feature size and/or voltage supply may decrease), and device count of ICs has greatly complicated the task of optimizing power dissipation.

The ability to accurately evaluate, predict, and optimize power dissipation of an IC, or cells within the IC, enables designers to design better products. Power dissipation is a major issue in mobile products by virtue of the battery driven nature of such products, with lower power consumption resulting in longer battery life per charge. Low power dissipation also means lower package and die costs. In high performance computer products, power dissipation is a major concern since excessive power consumption, either by heat or by electro-migration, can damage a chip. Thus, there has been an increase in the reliance and use of power analysis tools to aid in the fabrication of ICs using traditional fabrication design tools.

The term EDA (Electronic Design Automation) as used herein includes all design automation tools that facilitate the design of an electronic circuit at the behavior, register, gate-level transistor and/or layout levels.

Also, the term cell is intended to include circuit portions within an IC that can be identified as discrete structures providing a function. For example, depending on the level of abstraction used to model a cell, the term may include structures defined at the physical level such as a transistor; at the gate/logic level such as a NAND or OR gate; or at the macro level such as a simple adder or flip-flop. The level of abstraction used depends on the design cycle stage and the speed at which modeling needs to be completed, among other things. Design automation tools that generate cell models at higher levels of abstraction tend to run faster but have a relatively greater margin of error, while such models using lower levels of abstraction tend to run slower but have a relatively lower margin of error.

Power dissipation within a cell has two fundamental components—dynamic and static power dissipation. Dynamic power dissipation is the amount of power expended by a cell in response to at least one input signal transitioning from one switching threshold to another (input signal transition) and which may also result in at least one output signal transition from one switching threshold to another within a given time period. For example, an input signal going from high to low, or vice versa, is defined as an input signal transition. Static power dissipation is the power dissipated due to current flowing from Vdd to ground such as when no signals are switching from one logic state or another. Thus, dynamic power dissipation is a function of circuit switching activity and the state of the cell, while static power dissipation is only a function of the logic state of the circuit.

The focus of the following invention is on dynamic power dissipation rather than static power dissipation since dynamic power dissipation represents a much larger portion of the total power dissipation of a typical logic circuit.

Dynamic power dissipation comprises a charge/discharge power component due to capacitive load and a short-circuit power component due to the effect of non-ideal switches that cannot be turned on and off instantaneously. As discussed in "On-Chip Power Evaluation Methods and Issues," by authors Amir Zarkesh and Wolfgang Roethig, published in the proceedings of the session entitled "On-chip Systems Design Conference," Design Supercon 97, page S141-S141-33, ISDN: 0-1933217-29-3,the energy dissipated for a charge of capacitance can be expressed with the equation below, where E is the total energy dissipated for a given capacitance C and voltage Vdd.

$$E = \frac{1}{2} * C * Vdd$$

Therefore, the charge/discharge power consumed by a driver of a signal switching circuit with frequency f is:

$$P = f * [\frac{1}{2} * C * Vdd].$$

For circuits that do not switch at a constant frequency f, an effective frequency, f_eff may be introduced. The effective frequency is the basic switching frequency multiplied with an activity factor, act, and is shown by the following equation: f_eff=f* act.

Table 1 below shows the activity factors for certain types of cell activities.

TABLE 1

| Signal | Activity Factor |
| --- | --- |
| Clock | 2 |
| Counter LSB | 1 |
| Random Data | 0.5 |
| Reset | Approx. 0 |

FIG. 1 is a schematic diagram showing a capacitive output load seen by the output pin of a driving cell in an example electronic circuit. For example, the capacitive output load seen by an output pin 2 at driving cell 4 includes cell load 6 and wire load 8. Cell load 6 includes all input pin capacitances of cells driven by driving cell 4, such as input pin capacitances 10a through 10n in cells 12a through 12n, respectively. Wire load 8 is the sum of the effective capacitance of net 14 to which output pin 2 is attached.

Measuring the cell load of driven cells may be accomplished through design automation modeling. Wire load may be measured through parasitic extraction if the wire load is calculated at the post-layout state. Parasitic extraction is known in the art. Both self capacitance to Vdd and Vss, and mutual capacitance to other signal interconnect wires also must be taken into account when measuring wire load.

Short-circuit power is proportional to the effective frequency f_eff since short circuit power always occurs concurrently with dynamic power and is dependent on the short circuit current path of a cell. As known in the art, characterization by accurate simulation is one method of modeling short circuit power in a cell.

Analyzing the power dissipation in an electronic circuit having multiple and/or different structures or cells, requires differentiating between external and internal cell power dissipation. External power may be defined as the power dissipated due to an external load, while internal power consists of short circuit power plus charge/discharge power dissipated by internal cell capacitances. Thus, in an electronic circuit having multiple cells or stages, both charge/discharge power and short circuit power in every cell must be calculated to determine the total power dissipation of the circuit. Since short circuit power of internal states of a cell depends on internal input slew rates rather than on primary input slew rates, and since the capacitive load is only seen by the last stage, the slew rate and load dependency of internal power is somewhat decoupled. The first stage is affected by the input slew rate (its load is a constant internal capacitance), and the last stage is affected by the external load seen by the last stage (since the last stage's input slew rate is an internal slew rate weakly affected by the primary input slew rate).

As known in the art, the term "slew rate" is defined as the rate of change of a voltage signal that changes from one signal value to another signal value over-time, such as a logic transition that changes from a logic LOW state to a logic HIGH state, or vice versa.

Power dissipation in sequential cells, such as a basic latch or flip-flop, is discussed below. A basic latch consumes power, if an input switches while the latch is transparent. If the latch is blocked, the switching input causes no power consumption. A flip-flop consists of basic master and slave latches in addition to an input buffer and a clock buffer. Therefore, power is consumed whenever the input or the clock signal switches. If the input switches while the clock is low, the master stage is transparent and thus, will consume power as well. On the rising edge of the dock, data is transferred from master to slave. Hence the slave and the output buffer will consume power, if the new output data is different from the old output data. On the falling edge of the clock, data is transferred from the input buffer to the master latch. Hence, the master latch consumes power if the new input data is different from the old stored data.

Sources of Dynamic Power Dissipation in a Cell

As pointed out above, short circuit currents and currents due to transient signals, such as switching transitions between logic states, are the main sources of power dissipation in a cell. For deep submicron designs, wire load tends to become more important than cell load in the case of random logic where the wires can be routed all around the chip. For data path structures with regular layout, both wire load and cell load scale down in essentially the same way. The overall ratio between load and short circuit current is almost unaffected, since both slew rate and load scale down in deep submicron design. However, the design style chosen has a major impact on the transient load current versus short circuit current. For example, optimally sized buffers exhibit both better performance and less power. For low threshold devices, static leakage current tends to increase, but is not of a significant amount compared to the dynamic power dissipated by such devices.

The switching activity component of dynamic power dissipation, which is predominant in logic and flip-flops, is more difficult to estimate, model and characterize than short circuit current. Currently, only simulation-based tools with accurate timing models can give a good picture of the power dissipated as a function of the input stimulus. Power optimization techniques in later design stages need to be able to reduce this part of the power consumption locally such as at the macro cell or even gate-level stage using characterization and simulation data that may be generated using design automation tools.

Prior methods of calculating the dynamic power dissipation of a cell at the macro cell or gate level are either very simplified and not very accurate, or are accurate but unwieldy since the number of variables used for computing power dissipation is exponentially proportional to the number of input and output pins used in the cell. More importantly, such prior methods are not well-suited for use with existing cell libraries that use complex arcs for cell timing information. A complex arc defines a sequence of events, such as an event X followed by events Y and Z, and is further described below.

The term "pin" is used herein to denote electrical connection points located on the boundary of the structure being modeled, such as first and second inputs 62, 64, carry-in input 66, carry-out output 68, and sum output 70 in a full adder like that shown in FIG. 2A, or such as the pins found in a NAND gate having two logical inputs (two input pins) and one logic output (one output pin)

A Simplified Linear Method for Analyzing Dynamic Power Dissipation

One prior art method of analyzing dynamic power dissipation of a cell includes using a simplified linear model to express energy dissipated as a function of the slew rate of an input signal transition asserted on the cell, the load seen by the output of the cell (output load), and the voltage swing of the input and output signal transitions. A more accurate model may be obtained by using a non-linear model that is a function of the slew rate of the input transition signal, the output load, and a characterization table having energy per transition values. As noted above, the simplified linear model is not very accurate, while the non-linear model can become very unwieldy when used to calculate the power dissipation of a cell having many input and output pins.

The energy per transition values, input slew rates, output loads, and cell state are obtained from cell modeling, as known in the art.

Non-Linear Methods for Analyzing Dynamic Power Dissipation

Under the non-linear approach, state-based modeling of the power dissipation of a cell uses input slew rates, output loads, and cell state generated from cell modeling to determine which energy per transition value is applicable for each transition analyzed. Total dynamic power dissipation of a particular cell includes calculating the energy dissipated by the cell for every pin having a state change in response to the assertion of a signal transition to one of the input pins of the cell. This approach results in an accurate model of the energy expended per transition. But the process can become very unwieldy depending on the number of input and output pins contained by a cell since it requires calculating the energy dissipated for every output state change that occurs in the cell for each rising and falling transition that can occur at each input pin of the cell.

For example, turning now to FIGS. 2A and 2B, calculating the power dissipation of a full adder 60 requires a total of four (4) energy per transition calculations per transition direction of an input signal because for each signal transition asserted for each input there can be four possible states. Specifically, an input signal transition asserted at first input 62 having a slew rate with a falling slope (a falling input signal transition direction), will require an energy per transition calculation for the possible case that:

1) second input 64 is at logic 0, carry-in input 66 is at logic 0, carry-out output 68 is at logic 0 and sum output 70 is at logic 0;

2) second input 64 is at logic 0, carry-in input 66 is at logic 1, carry-out output 68 is at logic 0 and sum output 70 is at logic 1;

3) second input 64 is at logic 1, carry-in input 66 is at logic 1, carry-out output 68 is at logic 0 and sum output 70 is at logic 1; and 4) second input 64 is at logic 1, carry-in input 66 is at logic 1, carry-out output 68 is at logic 1 and sum output 70 is at logic 0.

Another set of energy per transition calculations must also be performed for the case where an input signal transition having a rising slope is asserted at first input 62, as shown in truth table 72 of FIG. 2B which corresponds to full adder 60 in FIG. 2A. The energy per transition calculation for a rising input signal transition includes the possible case that:

1) second input 64 is at logic 0, carry-in input 66 is at logic 0, carry-out output 68 is at logic 0 and sum output 70 is at logic 1;

2) second input 64 is at logic 0, carry-in input 66 is at logic 1, carry-out output 68 is at logic 1 and sum output 70 is at logic 0;

3) second input 64 is at logic 1, carry-in input 66 is at logic 1, carry-out output 68 is at logic 1 and sum output 70 is at logic 0; and 4) second input 64 is at logic 1, carry-in input 66 is at logic 1, carry-out output 68 is at logic 1 and sum output 70 is at logic 1.

Thus, as can be seen in the preceding example, each input pin in the cell which could possibly be affected by input signal transitions would require four (4) energy per transition calculations—a situation that can quickly become unwieldy as the number of output pins per cell increases.

Another known method for determining energy dissipation of a cell assumes that the energy per transition of a cell is equal to the energy dissipated by a signal transition occurring at an output for a given input signal, while all other outputs are held to a zero load.

For example, referring again to FIGS. 2A and 2B, calculating the energy dissipation for a signal transition asserted at second input 64 includes calculating the energy dissipated by a signal transitioning at sum output 70 by using the slew rate from the input signal applied at second input 64 and a load 71 seen by sum output 70 to determine the energy dissipated by the transition.

In the situation where more than one output undergoes a transition for a given input signal, the energy dissipated at each additional output transition also must be calculated. In the event that an input signal at second input 64 causes both sum output 70 and carry-out output 68 to change states, the total energy dissipated is the energy dissipated by the switching that occurs at second input 64, the switching that occurs at both outputs 68, 70 and the short-circuit energy dissipated by adder 60. In this scenario, determining the total energy dissipated requires calculating the energy dissipated due to: 1) the switching that occurs at second input 64 using a given slew rate and the resulting switching that occurs at sum output 70 having load 71, while the other remaining output, carry-out output 68 is held to have zero load at load 69; and 2) the switching that occurs at second input 64 using a given slew rate and the resulting switching that occurs at carry-out output 68 having load 69, while sum output 70 is held to have zero load at load 71. This method must also account for the double counting of short circuit and internal charge-discharge energy of the adder caused by the calculation, which is subtracted from the calculated energy dissipated by subtracting the energy dissipated by the switching of second input 64, while both outputs 68, 70 are held to have zero load at loads 69 and 71.

The above method is applicable to cells having many output pins without becoming too unwieldy to calculate because the state of the cell is not required in order to determine energy per transition values but is used simply to determine whether power dissipation that is due to two output states transitioning has occurred. However, this method is not compatible with the cell characterizations that are generated under the widely used arc-based cell modeling technique.

Arc-based Modeling under the Advance Library Format Method

Arc-based modeling, described in the reference manual entitled, "Advance Library Format for ASIC Cells and Blocks," version 0.9, published by Open Verilog International, (hereinafter, Advance Library Format reference) and, hereby incorporated by reference as if fully set forth herein, relies on a delay-based timing model of a cell to provide the necessary set of characterization variables necessary for analyzing the energy dissipation (and hence, power dissipation) of a cell. For a given set of stimuli, a delay-based timing model describes the cell's timing characteristic using complex arcs to describe a sequence of events. For example, an "input event a that is eventually followed by an output event X, output event Y, and output event Z."

An event is defined as a logic transition that occurs at a pin. For example, an input and output pin pair may have a timing characteristic that would be represented using a complex arc that is defined for a "rising edge on input pin A (first logic transition or event) which is followed by a falling edge on output pin Z (second logic transition or event)."

A complex arc is obtained from functional information that may be available for a library that describes the cell or directly from a design automation tool that generates functional information about the cell. The complex arc may include output pin load, input pin slew rate, skew between multiple switching inputs, voltage, and temperature. A complex arc may also contain state information. For example, in the delay-based timing model, a complex arc is created for each input and output pin pair in the cell for a given input pin slew rate and output pin load, while all other output pins are held to a zero load. Thus, a complex arc describes cell behavior without explicitly describing the stimuli (output pin load, and the like . . . ) applied to the cell that caused the events described by the arc.

Power characterization is a superset of cell timing characterization using the same set and range of characterization variables, including load, input slew rate, skew between multiple switching inputs, voltage, and temperature. Thus, a complex arc can provide the necessary cell characterization variables that are required to determine the power dissipated by the cell switching activity described by the arc.

The energy per transition values, input slew rates, output loads, cell state, and the like, are related to the cell's functional characteristics and may be obtained, with varying degrees of accuracy depending on the level of abstraction used, through the modeling of the cell using design automation tools discussed above. The cell is modeled to characterize the circuit's dynamic response to a given set of inputs, resulting in a set of values representing over time the circuit's performance characteristics. The cell models form a library of circuit information that give designers circuit characteristics such as capacitance (pin capacitances, transistor capacitances, interconnect capacitances, and the like), and output values of the cell in response to asserted input signals and the slew rates of such input signals to the circuit or cell. Calculating the power dissipation of the cell through energy per transition values uses these modeled characteristics.

As discussed above, energy dissipation caused by switching activity is a function of the charge/discharge current and short circuit current for a given set of cell characterization variables. Consequently, complex arcs are used, as disclosed in the Advance Library Format reference, to determine the number and type of transitions that occur for a given set of stimuli. The transitions in each complex arc can then be used to determine the energy dissipated by the cell.

The method tracks transitions (both input and output) by maintaining an event queue for each output transition that occurs for a given input transition. Also, in a case where more than one output transition occurs for a given input pin transition, the method must determine the order of occurrence for each output transition. This causes the method to maintain a variable number of queues for tracking each transition for a given input pin and for all output pins, and for determining the order of occurrence of each transition that occurs at each output pin. This is inefficient because the number of queues required to perform energy and power dissipation calculations vary according to the number of output pins that may incur a transition caused by an input transition that occurs at a cell. Thus, the method becomes inefficient very quickly when evaluating cells that have many output pins, such as a cell having more than two outputs, because a queue must be maintained for each of the output pins.

Since a complex arc that represents the case where a signal transition occurs at more than one output for a given input transition cannot accurately model the actual sequence of each output transition, the method must model each possible sequence of output pin transitions that can occur. Each possible sequence must be considered because the order of transitions occurring at the output pins cannot be predicted by cell modeling. This greatly increases the inefficiency of the method in calculating energy dissipated since an arc must be generated for each possible output transition sequence for a given input pin transition.

For example, the case where carry-out output 68 and sum output 70 transition in response to an input transition at second input 64 in full adder 60 requires the generation of two arcs to cover all possible sequences that can occur between carry-out output 68 and sum output 70; an arc where carry-out output 68 transitions first and sum output 70 transitions second; and another arc where sum output 70 transitions first and carry-out output 68 transitions second. The need to cover all possible output pin sequences exponentially increases the number of arcs that must be generated.

The increased use and importance of power analysis tools has created a need for new cell libraries. But library creation/generation is also a complex task, resulting in a need to leverage existing cell libraries by providing a power analysis tool that is compatible with EDA tools that provide widely-used cell characterizations, such as arcs, while remaining easy to implement and efficient to use.

Accordingly, there exists a need to provide a power analysis system and tool that are both accurate and efficient yet compatible with the arc-based timing methodology.

SUMMARY OF THE INVENTION

The present invention evaluates the power dissipation of an electronic circuit and is implemented within a system that includes a power evaluation tool having a software application program for execution by one or more processors of a computer under the direction of an installed operating system program. The power evaluation tool calculates an energy value for each arc that corresponds to a sequence of transitions generated during the electronic simulation of an electronic circuit design that may correspond to an actual electronic circuit. If desired, a power dissipation value may be calculated from the energy values obtained during simulation.

The power evaluation tool relies on data that includes an electronic circuit design description of the electronic circuit, such as a gate level netlist; a cell library having a power model corresponding to a cell instance; cell activity data; and the total effective load seen by each cell pin of the cell instance to be evaluated for power. The cell activity data includes net transitions which are generated during dynamic and direct simulation of the cell instance, while the power model includes simple arcs (transition delay values, energy per arc values, cell input capacitances, and output slew rate values) and power evaluation data, which pertain to each logic cell instance within the electronic circuit.

In the present invention, a simple arc is used to represent the behavior between boundary pins, such as between an input and output pin pair, where the input pin has asserted on it an input signal having a given slew rate and the output pin has a given output pin load, while all other cell output pins are held to have a zero output load. In essence, a simple arc represents a possible logic condition between the input pin and the output pin for a given input transition signal slew rate asserted at the input pin and for a given load seen by the output pin, without the need to define the states of the other pins in the cell instance.

The total energy dissipated by the cell instance during the modeled activity is calculated by determining the number of arcs applicable to the cell instance, attributing an energy dissipated for each arc, adding the energy values, and compensating for any double counting of short circuit and internal charge/discharge energy. Two fixed-width queues are used by the system as directed by the software code in the power evaluation tool. A queue may be defined in memory under program control but may be of any structure either in software or hardware. For each cell instance, the power evaluation tool uses a first queue to track every transition and direction of the transition that occurs at an input pin, while a second queue is used to track every transition and direction of the transition that occurs at a boundary pin (i.e., an input pin or at an output pin). A power value for the cell instance may then also be obtained from the total energy dissipated during the modeled activity.

BRIEF DESCRIPTION OF THE DRAWINGS

FIG. 1 is a schematic diagram showing a capacitive output load seen by the output pin of a driving cell in an example electronic circuit.

FIG. 2A is a block diagram of a full adder.

FIG. 2B is a truth table corresponding to the full adder shown in FIG. 2A.

FIG. 3B is a block diagram of a power model of a cell instance created by a characterization tool in accordance with a preferred embodiment of the present invention.

FIG. 4A is a system level flow of a method of power evaluation for an electronic circuit design in accordance with a preferred embodiment of the present invention.

DETAILED DESCRIPTION OF THE PREFERRED EMBODIMENTS

In the following description, a preferred embodiment of the invention is described with regard to preferred process steps and data structures. Those skilled in the art would recognize after perusal of this application that embodiments of the invention can be implemented using circuitry in a microprocessor adapted to the particular process steps and data structures, and that implementation of the process steps and data structures described herein would not require undue experimentation or further invention.

System Overview

Figure 3A:
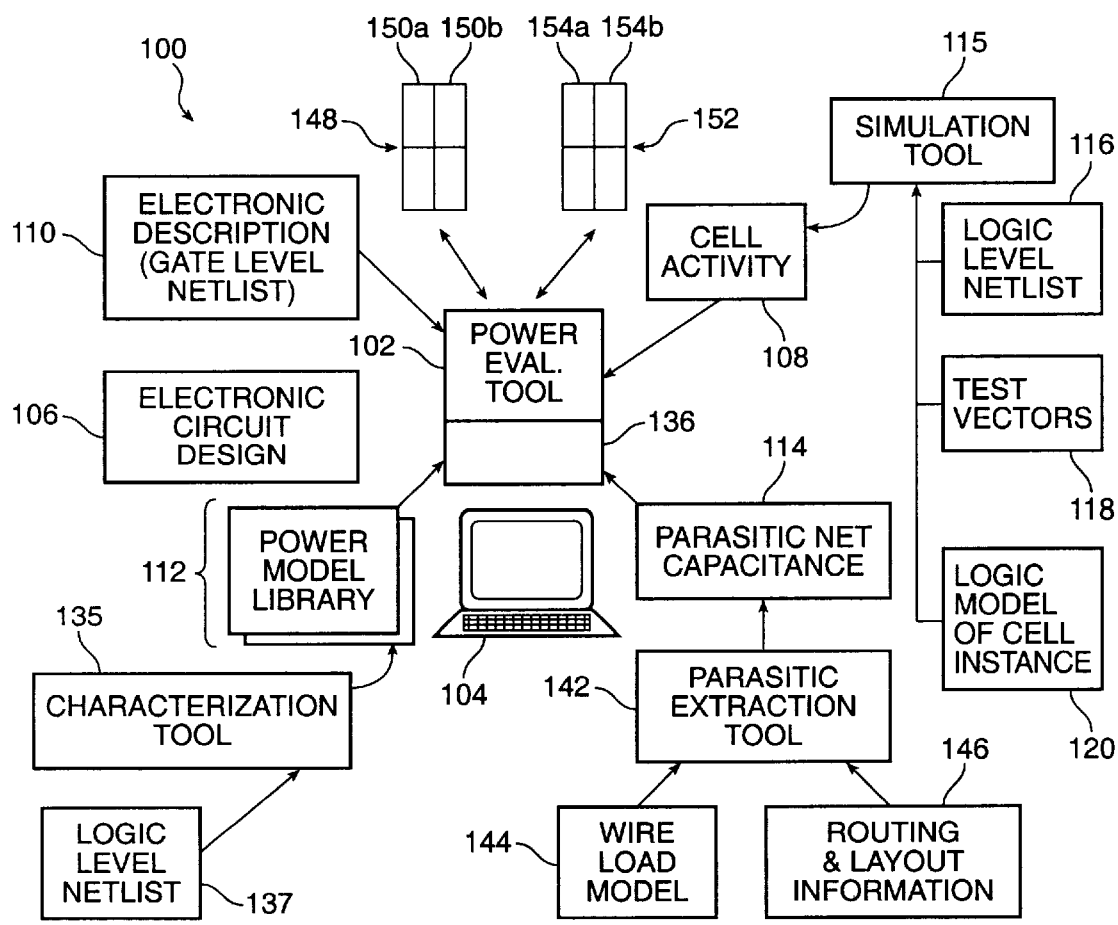
FIG. 3A is a block diagram of a system for power analysis including the calculation of power dissipation of a cell in accordance with a preferred embodiment of the present invention.

FIG. 3A is a block diagram of a system for power evaluation including the calculation of power dissipation of an electronic circuit design in accordance with a preferred embodiment of the present invention.

FIG. 3B is a block diagram of a power model of a cell instance created by a characterization tool in accordance with a preferred embodiment of the present invention.

A system 100 includes a power evaluation tool 102 having a software application program for execution by a computer 104 under the direction of an installed operating system program. For each electronic circuit design chosen 106 for power evaluation, power evaluation tool 102 receives input information that includes cell activity data 108, an electronic description of the electronic circuit 110, a library of power models 112 corresponding to the cells in electronic circuit design 106, and parasitic net capacitance values 114. This information is used by power evaluation tool 102 to generate energy per arc values which are then used to calculate a total dynamic power dissipation value caused by the simulated circuit activity for a given time period.

Computer 104 comprises a processor having program and data memory, mass storage, a keyboard, and pointing device or other input devices, and a display or other output devices (not shown). The processor operates under control of the operating system and applications software stored using the mass storage and copied to the data memory for use, and operates upon temporary and output data structures stored in the data memory and copied to the mass storage or displayed for output, as appropriate.

Cell Activity Data

Cell activity data 108 includes net transitions (such as cell logic waveforms) that are generated during dynamic and direct simulation of the electronic circuit. Simulation is performed using a simulation tool 115, such as model VCS, available from Synopsys Inc., of Mountain View, Calif. In a preferred embodiment of the present invention, simulation is performed at the gate level using test vectors 116, logic level netlist 118, and a logic model of a cell 120 within electronic circuit design 106 that is affected by test vectors 116 during simulation.

Electronic Design Description

Electronic design description 110 describes the cells and their interconnections (nets) that connect the cells together that comprise electronic circuit design 106. In accordance with a preferred embodiment of the present invention, electronic description 110 is in the form of a gate-level netlist that is generated using a synthesis tool, such as those available from Synopsys of Mountain View, California. Synthesis tools and gate-level netlists are known in the art.

Power Model

A power model describes behavioral characteristics of an electronic circuit design at the cell level. In accordance with a preferred embodiment of the present invention, a power model 121 in power model library 112 includes simple arcs 122, input slew rates 124, output slew rates 126, output load values 128, energy per arc values 130, and cell input capacitances 132. The same power model is used for each instance in which a cell is used in an electronic circuit design. For example, if there are 15 cells of full-adders having the same design, there would be 15 instances of that cell to which a single power model would be created. The single power model would then be used by the present invention to describe each cell instance when needed, such as when a transition occurs at a boundary pin of one of the cell instances.

A boundary pin is defined as any electrical connection, such as an input or output pin, in a cell connected to a net which in turn, is connected to other pins within the boundary of the cell and/or to the boundary of other cells. A net is a subset of a network of wires (interconnect) that connects cells by their boundary pins so as to form an electronic circuit. An interconnect is defined as the interconnections between cells or hardware elements. For example, referring to again to FIG. 1, output pin 2 is considered a boundary pin since it connects to net 14, which in turn, connects to input pins 16a–16n of driven cells 12a–12n.

A complex arc describes a sequence of events that occur in response to a prior event, with or without a given set of state information, while a simple arc describes a sequence of two events that includes a first event that causes a second event to occur. In accordance with a preferred embodiment of the present invention, only simple arcs are described in power model 121, where each simple arc describes a sequence of two logic transitions. For example, a simple arc would describe a logic transition X followed by a logic transition Y.

The simple arcs are used to characterize cell behavior during cell activity such as activity that occurs during dynamic simulation of a cell design. Each simple arc represents a first logic transition at a first boundary pin which later is followed by a second logic transition at a second boundary pin. For example, a simple event arc may represent an input logic transition at an input pin which is later followed by an output logic transition at an output pin.

Each power model may be generated using a characterization tool 135 from a logic level netlist 137 and stored in a cell library (not shown). Logic level netlist 137 is generated from a circuit design description of the electronic circuit to be evaluated. For example, a power model in cell library may be created from a register transfer level (RTL) description of the electronic circuit design. Characterization tools and the generation of logic level netlists are known in the art.

Energy per Arc Table

As shown in FIG. 3B, the input slew rate, output load, and energy per arc values are stored in a energy per arc table 134. In a preferred embodiment of the present invention, energy per arc table 134 has a list of energy per arc values 130 for a given slew rate and load value pair, creating a two-dimensional transition table. Table 134 enables power evaluation tool 102 to obtain an energy per arc value for an input slew rate and load value pair by using a given pair's corresponding arc as an index to an energy per arc value. Also, power evaluation tool 102 has a program module 136 (see FIG. 3A), or equivalent, that extrapolates an energy per arc value from two slew rate and load values pairs, if a particular cell that is being evaluated has slew rate and load values that fall between listed slew rate and load values in the two-dimensional table. This enables power evaluation tool 102 to calculate a power dissipation value for logic transitions that are described by a simple arc which gives a slew rate, and output load. The slew rate and output load can then be used to index an energy per arc value from table 134.

As known in the art, input slew rates can be generated from an electronic circuit design using the process of back annotation. In the preferred embodiment of the present invention, the input slew rates above are generated according to this process although this process is not intended to limit the present invention in any way.

Input capacitance values 132 are provided through the generation of power model 121 using characterization tool 135, while total parasitic net capacitances 114 are calculated by using a parasitic extraction tool 142 on a wire load model 144, if circuit design power evaluation is in the pre-layout stage; or on a routing and layout model 146, if power evaluation is in the post-layout stage.

Power Evaluation Tool

In accordance with the present invention, power evaluation tool 102 is comprised of software code that correlates a transition to an arc (the arc is found in a power model that matches the cell instance from which the transition occurred) which is correlated to an energy per arc value, enabling the calculation of the power dissipation of a cell that was characterized by the arcs used. This greatly simplifies the modeling of the cell and results in an efficient, yet accurate way to analyze energy dissipation of that cell since calculating the energy dissipated for each logic state caused by each possible input transition that could occur for each input pin, (in the state-based model discussed above, there would be $2^N$ number of calculations, where N represents the total number of inputs in a modeled cell, resulting in a total of 24 calculations), is no longer required.

In the present invention, a simple arc is used to represent the behavior between boundary pins, such as between an input and output pin pair, where the input pin has asserted on it an input signal having a given slew rate and the output pin has a given output pin load, while all other cell output pins are held to have a zero output load. In essence, a simple arc represents a possible logic condition between the input pin and the output pin for a given input transition signal slew rate asserted at the input pin and for a given load seen by the output pin, without the need to define the states of the other pins in the cell. Thus, instead of modeling a cell for each rising and falling signal transition occurring at an input for each possible logical combination that can be asserted at the other remaining input pins and attributing an energy per transition value for each transition, as in the state based approach, an energy value is attributed to each arc generated for a cell.

The total energy dissipated by the cell instance during the modeled activity is thus calculated by determining the number of arcs applicable to the cell instance, attributing an energy dissipated for each arc, adding the energy values, and compensating for any double counting of short circuit and charge/discharge energy values. Two fix-width queues are used by system 100 as directed by the software code in program analysis tool 102. A queue may be defined in memory under program control but may be of any structure either in software or hardware that results in a FIFO queue that has a capacity of two items. For each cell instance, program analysis tool 102 uses a first queue 148 to track every transition 150*a* and direction 150*b* of the transition that occurs at an input pin or at an output pin, while a second queue 152 is used to track every transition 154*a* and direction 154*b* of the transition that occurs at an input pin. A power value for the cell instance may then also be obtained from the total energy dissipated during the modeled activity.

Besides being much more efficient than the state-based method discussed above, first queue 148 and second queue 150 enable power evaluation tool 102 to track transitions and their respective directions regardless of the number of input or output pin a cell instance contains. This is a vast improvement to the above-described power analysis method that instead relies on complex arcs because the above-described method must use a queue for every transition (and its direction) at an output pin corresponding to a modeled cell, besides an additional queue fort racking every transition (and the transition's direction) that occurs at a selected input pin. Additional tracking mechanisms must also be provided if the complex arcs used include state information. Providing a queue for every output pin is a major disadvantage since calculating energy dissipation in cells with many outputs becomes very unwieldy to calculate and thus inefficient.

Method of Operation

FIG. 4A is a system level flow of a method of power evaluation for an electronic circuit design in accordance with a preferred embodiment of the present invention.

At step 200, input information for use by power evaluation tool 102 is generated and stored in a memory structure, such as a database, for later retrieval. In the preferred embodiment of the present invention, the input information may include the information shown in FIG. 3 such as: net transitions (see FIG. 5A, step 204), an electronic description of the electronic circuit 110, library of power models 112 corresponding to the cell instances in electronic circuit design 106, and parasitic net capacitance values 114. Net transitions 108 include corresponding slew rates values which are obtained through the process of back annotation. Back annotation is known by those reasonably skilled in the art.

At step 202, the electronic circuit design is simulated, resulting in a stream of new transitions. In accordance with a preferred embodiment of the present invention, step 202 is performed using a logic simulator that uses as input information: a logic level netlist of obtained from the electronic circuit description, a set of test vectors chosen by a user of the power evaluation tool, and a model of the cell being simulated. Each new transition provides the net location at which the transition occurred, a transition type, such as the direction of the transition ,and the time in which the transition occurred.

At step 204 (bypassing nodes A and B), power evaluation tool 102 receives each new logic transition as it occurs in step 202 and provides two queues for each cell instance for separately tracking two types of transitions that occur at that cell instance: input transitions and output transitions, and their respective directions.

At step 206, a first queue is used for storing input transitions and their respective directions (as they occur), and a second queue is used for storing all transitions, both input and output, and their respective directions (as they occur). Both queues store the transitions and their respective directions in a FIFO manner. Each queue is capable of storing at least two queue items with each item representing a transition and its corresponding direction. Once a queue is full, the next item that needs to be stored in the queue is stored in a FIFO manner, i.e., the earliest item is discarded to make room for the new item. In a preferred embodiment of the present invention, there is a first and second queue maintained for each cell instance used in the electronic circuit design being evaluated.

For each new transition that occurs at a cell instance, power evaluation tool 102 determines whether it is an input or output transition. If the new transition is an input transition, it is stored in both queues which correspond to the cell instance. If it is an output transition, it is only placed in the second queue. This enables power evaluation tool 102 to determine which input transition occurred last simply by checking the first queue. Similarly, power evaluation tool can also determine whether an input or an output transition was the last to occur by checking the second queue.

An input transition is defined as a logic transition that occurs at an input pin located at a cell boundary, while an output transition is defined as a logic transition that occurs at an output pin located at a cell boundary. A cell boundary defines the input and output pins that are connected to the net that connects the cell to other cells in an electronic circuit design.

At step 208, power evaluation tool 102 calculates a power dissipation value for each new transition as it occurs in each cell instance. This includes searching the power model to determine if there is an arc that corresponds to the transition and if so, generating an energy value that corresponds to the arc. The energy value is obtained from the information contained in the power model that was found to match the cell instance in which the transition occurred.

Figure 4B:
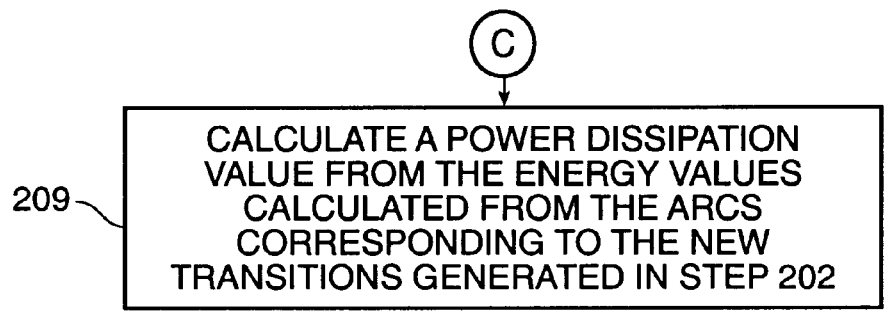
FIG. 4B is a system level flow of a method of power evaluation for an electronic circuit design in accordance with an alternative embodiment of the present invention.

FIG. 4B is a system level flow of a method of power evaluation for an electronic circuit design in accordance with an alternative embodiment of the present invention.

In an alternative embodiment of the present invention, step 209 is performed after step 208 starting from node C (see also FIG. 4A). Step 209 includes calculating a power dissipation value from the arcs corresponding to the new transitions generated by simulation.

Figure 4C:
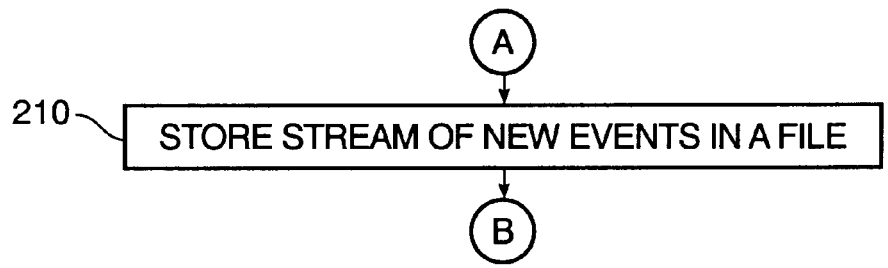
FIG. 4C is a system level flow of a method of power evaluation for an electronic circuit design in accordance with an alternative embodiment of the present invention.

FIG. 4C is a system level flow of a method of power evaluation for an electronic circuit design in accordance with an alternative embodiment of the present invention.

In another alternative embodiment of the present invention, step 210 is performed after step 202, starting from node A (see also FIG. 4A). Step 210 stores the stream of new logic transitions in a file. The process flow is then returned to step 204 via node B where the file is read to obtain each new transition.

Figure 5A:
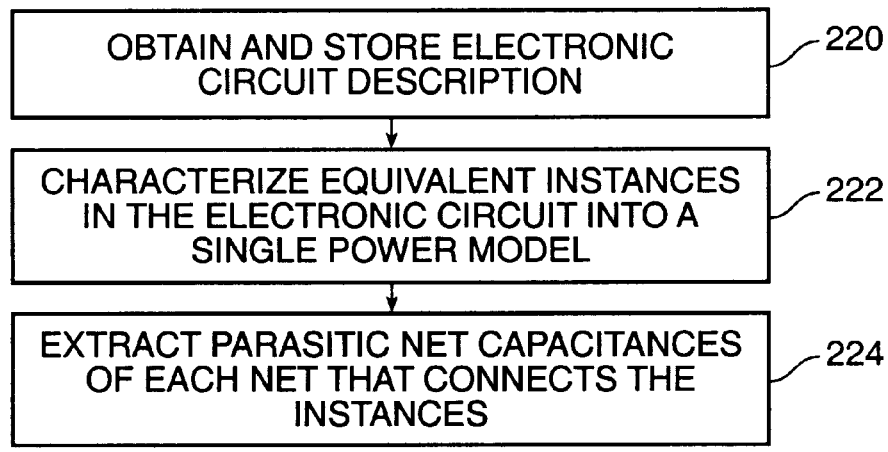
FIG. 5A is a process flow describing the substeps performed in FIG. 4 at step 200 by a power evaluation tool in accordance with a preferred embodiment of the present invention.

FIG. 5A is a process flow describing the substeps performed in FIG. 4 at step 200 by a power evaluation tool in accordance with a preferred embodiment of the present invention.

At step 220, an electronic circuit description of the electronic circuit design chosen for evaluation is obtained and stored. In accordance with a preferred embodiment of the present invention, the electronic circuit description is in the form of a gate-level netlist. Gate-level netlists are known by one reasonably skilled in the art.

At step 222, equivalent cell instances in the electronic circuit are characterized into a single power model and stored. In accordance with a preferred embodiment of the present invention, each power model created for a cell includes the boundary pins of each cell, such as input and output pins, simple arcs describing the behavior of the cell, an energy per arc table, input capacitances of the cell; and an output slew rate table.

At step 224, parasitic capacitances of each net that connects the cells in the electronic circuit are extracted from the netlist file by a parasitic extraction tool and stored.

Figure 5B:
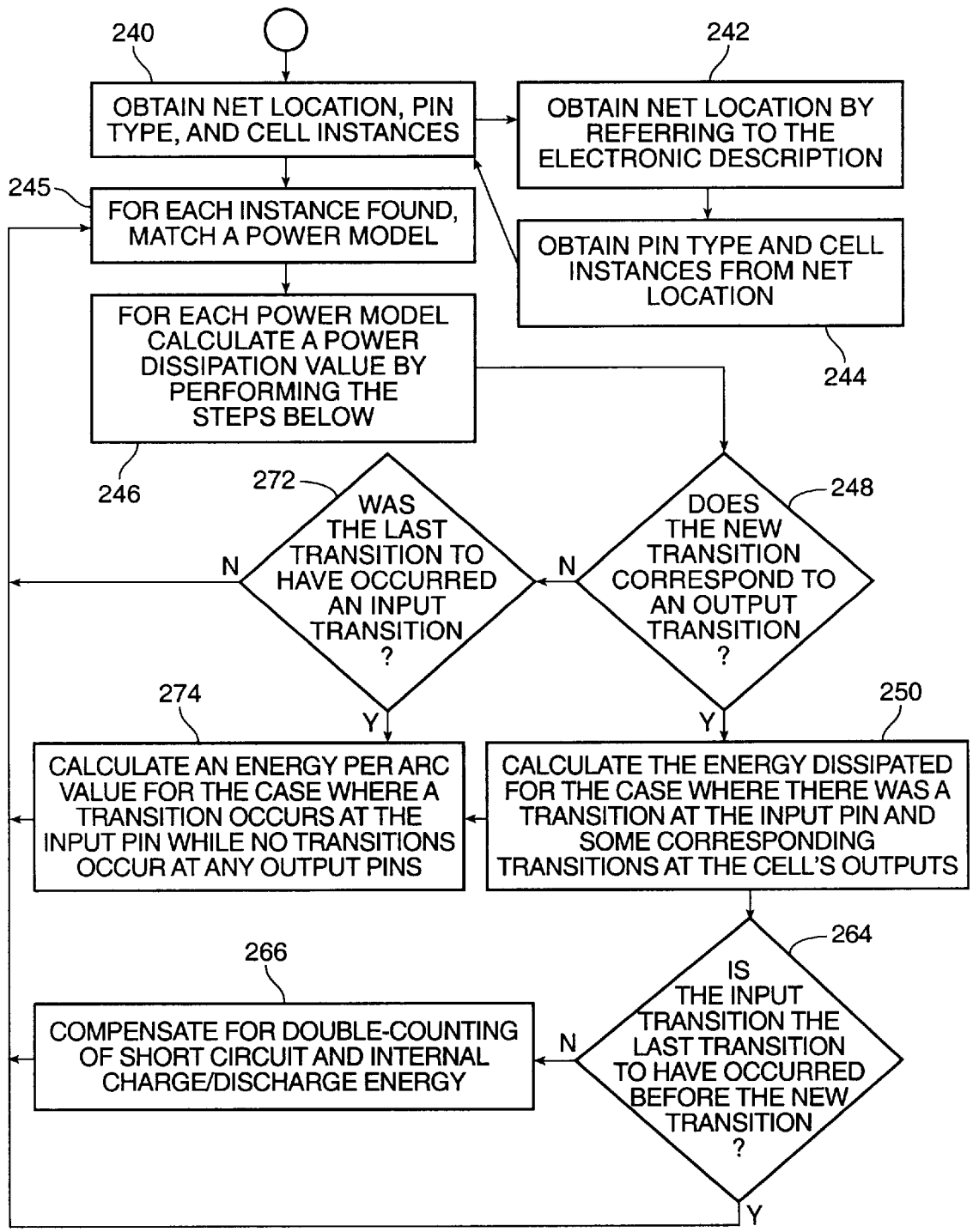
FIG. 5B is a process flow describing the sub-steps performed in FIG. 4 at step 208 by a power evaluation tool in accordance with a preferred embodiment of the present invention.

FIG. 5B is a process flow describing the sub-steps performed in FIG. 4 at step 208 by a power evaluation tool in accordance with a preferred embodiment of the present invention.

At step 240, for each new logic transition received in step 204, a net location of the new transition and the cell instance that corresponds to a cell having a boundary pin that is connected to the net location (and hence, that is affected by the new transition) are obtained according to the following substeps 242 through 244. The net location of the new transition could either have a pin type of an output pin or an input pin. More than one cell may have a boundary pin connected to the net location found. Thus, more than one cell instance may need to be used if the cells found correspond to different cell instances.

At substep 242, the net location is obtained from the electronic description, such as a gate-level netlist, of the electronic circuit design which is being evaluated.

At substep 244, the pin type and the cell instances, from which the new logic transition occurred, are obtained using the net location identified in step 240.

At step 245, for each cell instance found a cell power model is matched to the cell instance.

At step 246, for each cell power model matched to the cell instance, an energy value is calculated, as described in steps 248 through 266. The energy value represents the energy dissipated by the cell instance due to the transition occurring at the net location identified in steps 242 and 244.

At step 248, if the transition occurred at pin type of an output pin (the transition was an output transition), step 250 is performed. Otherwise step 272 is performed. In accordance with a preferred embodiment of the present invention, power evaluation tool 102 determines whether the pin type is an output pin by checking the second queue. If the last entry in the second queue is an output transition then the new transition, which correlates to the pin type, is assumed to be an output transition.

As discussed in step 206, the second queue is used for storing all transitions, both input and output, and their respective directions (as they occur).

Input Transition Occurred Before the New Logic Transition Scenario At step 250, an energy value is obtained by finding an arc that has an output transition matching the new logic transition and a corresponding input transition, and by using the arc to calculate an energy value. This step assumes that the new transition occurring at the net location that was found in step 240 occurred at an output pin. In a preferred embodiment of the present invention, step 250 includes the following substeps 252 through 260.

Figure 5C:
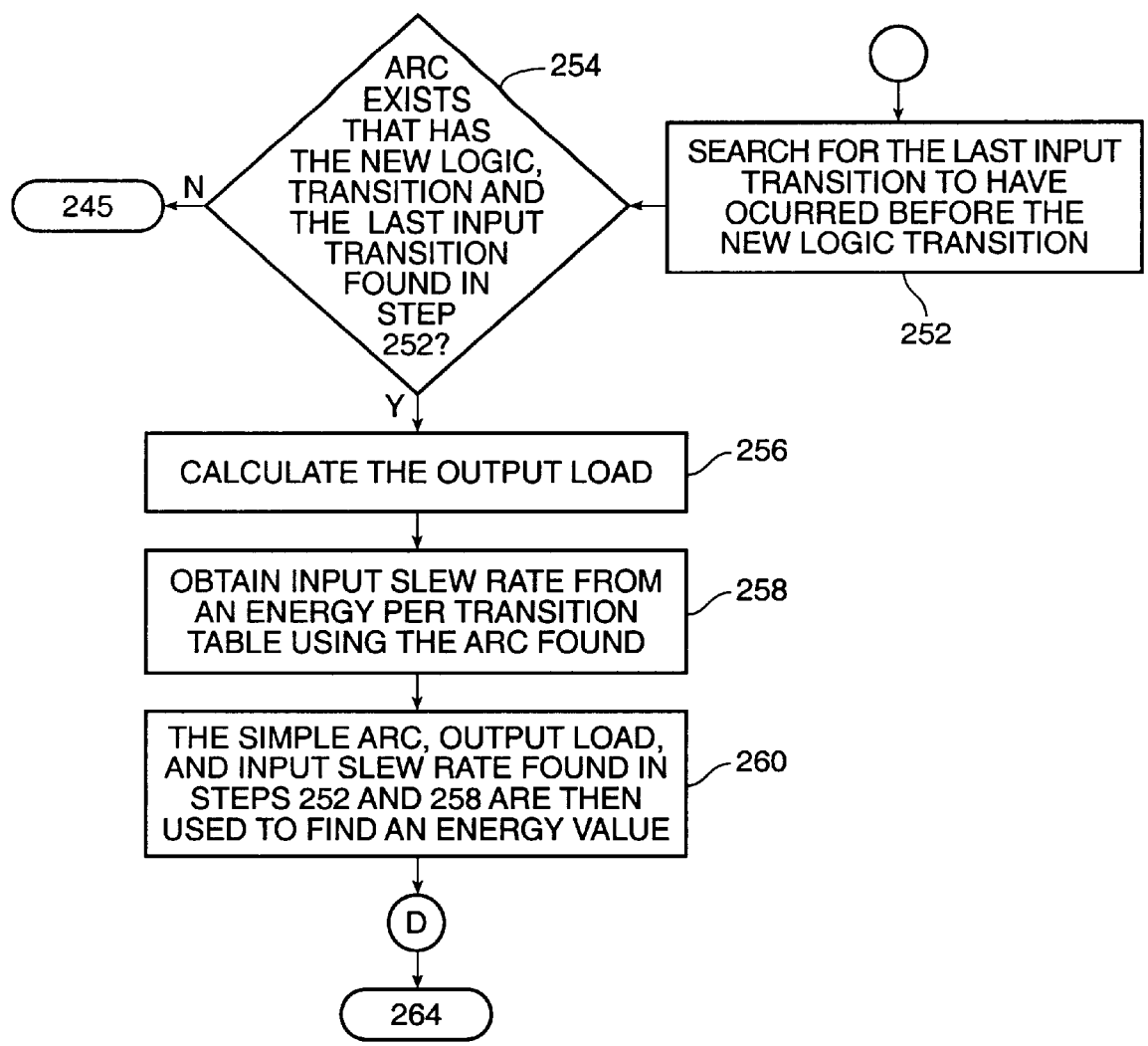
FIG. 5C is a process flow describing the sub-steps performed in FIG. 5B at step 250 in accordance with a preferred embodiment of the present invention.

FIG. 5C shows the process flow describing the sub-steps performed in FIG. 5B at step 250 in accordance with a preferred embodiment of the present invention.

Find the Input Transition That Occurred Before the New Logic Transition

At substep 252, a search is conducted for the last input transition (and its direction) to have occurred before the new logic transition. In the preferred embodiment of the present invention, this includes checking the first queue for the last input transition to have occurred. For example, the first item in the first queue is the last input transition to have occurred have occurred since the input transitions are stored in the queue in a FIFO manner (First In First Out). The last input transition (and its direction) found is then used with the new logic transition (and its direction), which was found to be an output transition in step 248, to find a corresponding simple arc.

Find Corresponding Arc

At substep 254, the cell power model that is found to match the cell instance (see step 245), is searched to determine whether an arc exists that begins with an input transition and its direction that match the input transition and its direction that were found in step 252 and ends with an output transition and its direction that matches the new logic transition and its direction. As presently preferred the present invention relies on each power model having simple arcs that describe a cell's functional behavior. In accordance with a preferred embodiment, each arc describes an input transition that is later followed by an output transition. If an arc exists that matches the criteria just described, step 256 is performed. Otherwise step 245 is performed.

At substep 256, the output load seen by the pin identified as an output pin in step 248 is calculated. This includes adding all of the input capacitances of each cell instance found in step 244 with the total parasitic capacitances in the net identified in step 240. In the preferred embodiment of the present invention, the total parasitic capacitance of each net used in the electronic circuit design is calculated at step 200.

At substep 258, the input slew rate is then obtained from the net location that connects to the input pin comprising the arc. The input slew rate may be obtained through the method of back annotation which is a method known in the art.

At substep 260, the simple arc found in step 254, output load found in step 256, and the input slew rate in step 258, are then used to find an energy value ("energy per arc") at an energy per arc table, providing the energy value referred to in step 250. If the energy per arc table has a matching arc that does not have the exact output load found in step 256 and/or input slew rate, an interpolation method may be used to interpolate an energy value. Interpolation methods that can calculate an energy value from two sets of output load and/or input slew rate values are known in the art. The process flow is then returned to step 264 after bypassing node D.

Figure 5D:
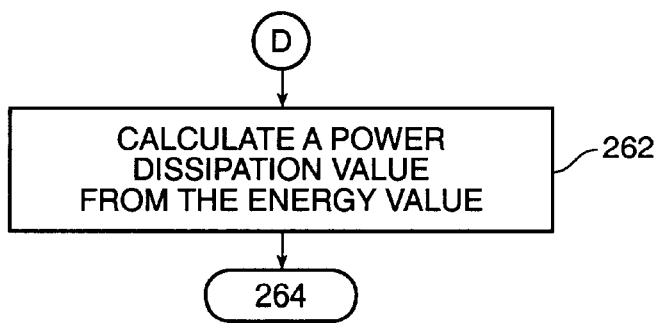
FIG. 5D is a process flow describing the sub-steps performed in FIG. 5B at step 250 in accordance with an alternative embodiment of the present invention.

FIG. 5D is a process flow describing the sub-steps performed in FIG. 5B at step 250 in accordance with an alternative embodiment of the present invention.

In an alternative embodiment of the present invention, step 262 may be performed after step 260 starting from node D (see also FIG. 5C). At step 262, a power dissipation value is calculated using the energy value calculated in the above steps over a time period set by the user. The process flow is then returned to step 264 via node D.

Returning to FIG. 5B at step 264, the input transition corresponding to the beginning of the arc found in step 254, is checked to determine whether it was the last transition that occurred prior to the new transition received in step 202. If not, step 266 is performed, otherwise step 245 is repeated until all cell instances found in step 244 are evaluated or until a period of time that the user has selected for simulation and evaluation has expired. If so, a new simulation event is received and the process begins again from step 240.

In the preferred embodiment of the present invention, step 264 is performed by using the second queue, which tracks all transitions that occur during simulation, to determine whether the input transition corresponding to the beginning of the arc found in step 254 was the last transition that occurred prior to the new transition received in step 202. Check to see if the second item (earlier to the first item) in the second queue is equal to the first item (top item) in the first queue.

Compensate for Double Counting If Required

At step 266, power evaluation tool 102 compensates for the double counting of short circuit and internal charge/discharge energy in step 254 by subtracting the short circuit and internal charge/discharge energy values from the energy value that was calculated in step 250. This includes the substeps of 268 and 269.

Figure 5E:
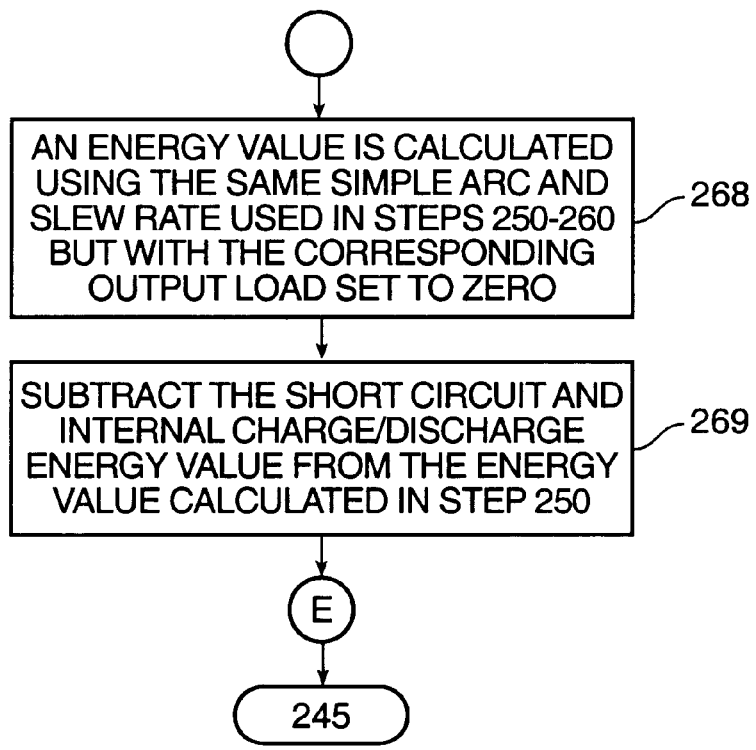
FIG. 5E is a process flow describing the sub-steps performed in FIG. 5B at step 268 in accordance with a preferred embodiment of the present invention.

FIG. 5E is a process flow describing the sub-steps performed in FIG. 5B at step 266 in accordance with a preferred embodiment of the present invention.

At step 268, an energy value is obtained from an energy per arc table, which corresponds to the power model used in steps 250–260, using the same simple arc and slew rate used in steps 250–260 but with the corresponding output load set to zero. In the event that an entry does not exist that has an energy value for an output load of zero, interpolation methods may be employed as known in the art. The energy value obtain in step 268 is the short circuit and internal charge/discharge energy of the cell instance in which the new transition occurred.

At step 269, the short circuit and internal charge/discharge energy is subtracted from the energy value calculated in step 250. Step 245 is then performed by bypassing node E.

Figure 5F:
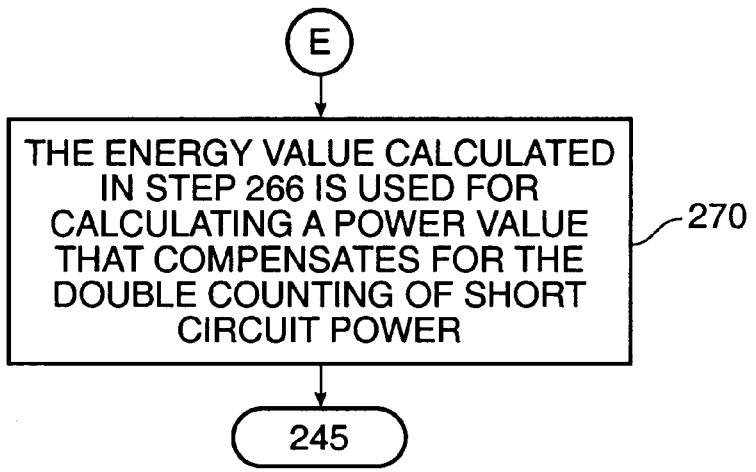
FIG. 5F is a process flow describing the sub-steps performed in FIG. 5B at step 268 in accordance with an alternative embodiment of the present invention.

FIG. 5F is a process flow describing the sub-steps performed in FIG. 5B at step 266 in accordance with an alternative embodiment of the present invention.

In an alternative embodiment of the present invention, if a power value is calculated for the energy value calculated in step 250, such as described in step 262, step 270 is performed after step 269 starting from node E (see also FIG. 5E). At step 270, the short circuit and internal charge/discharge energy calculated in step 268 is used for calculating a power value that compensates for the double counting of short circuit power. Step 245 is then performed.

New Logic Transition Is an Input Transition with No Output Transition Scenario If at step 248, the pin identified is not an output pin, step 272 is performed (see FIG. 5B). At step 272, it is determined whether the transition prior to the new transition is an input transition. This is accomplished by comparing the second item in the first queue with the second item in the second queue. If so step 274 is performed (the last transition before the new transition is an input transition), otherwise step 246 is performed.

At step 274, the energy dissipated is calculated for the case where there was a transition at the input pin of the last input transition (not the new transition) and there were no corresponding transitions at the cell's outputs, i.e., the cells states of corresponding output pins remain at their current states. Thus, the total energy dissipated as a result of the transition received in step 204 (see FIG. 4) is mainly attributable to the energy dissipated by the input transition. This is accomplished by searching through the power model to determine if there is an arc that corresponds to such a cell condition. If so, an energy value is calculated from that arc (since the arc represents the condition where an input transition occurred but no output transition followed). Step 245 is then performed.

While embodiments and applications of this invention have been shown and described, it would be apparent to those skilled in the art that many more modifications than mentioned above are possible without departing from the inventive concepts herein. The invention therefore, is not to be restricted except in the spirit of the appended claims.

What is claimed is:

1. A method for evaluating power dissipation of an electronic circuit design having at least one cell, the method comprising:

receiving input information descriptive of the electronic circuit design, said input information including a power model for each cell instance used in the electronic circuit design;

simulating the electronic circuit design so as to generate a simulated logic transition within the at least one cell;

storing said simulated logic transition in a first-in-first-out (FIFO) manner in a first queue and a second queue, if said simulated logic transition occurs at an input pin of one of the cells used in the electronic circuit design;

storing said simulated logic transition in a FIFO manner in said second queue, if said simulated logic transition occurs at an output pin of one of the cells used in the electronic circuit design;

searching a power model for a simple arc that corresponds to said simulated logic transition, said power model corresponding to a cell instance which corresponds to the cell in which said simulated logic transition occurred in said simulating; and generating an energy value using said simple arc.

2. The method of claim 1, further including calculating a power dissipation value using said energy value.

3. The method of claim 1 wherein said simple arc obtained in said searching represents an event where said simulated logic transition occurred at an input pin and no corresponding transition occurred at any output pin of the cell.

4. The method of claim 3, further including determining whether said simulated logic transition was the last transition to have occurred at said input pin.

5. The method of claim 4 wherein said determining includes comparing a second item stored in said first queue with a second item stored in said second queue, wherein said items include logic transitions stored in said queues.

6. The method of claim 1 wherein said simple arc obtained in said searching represents an event where said simulated logic transition occurred at an output pin and a corresponding prior transition occurred at an input pin of the cell.

7. The method of claim 6, further including determining whether said simulated logic transition was a last transition to have occurred at said output pin.

8. The method of claim 7 wherein said determining includes assuming said simulated logic transition as said last transition to have occurred at said output pin if a last item stored in said second queue is an output transition.

9. The method of claim 8 wherein said generating includes finding said simple arc in said power model having an output transition matching said simulated logic transition and a corresponding input transition.

10. The method of claim 8 wherein said generating includes finding said corresponding input transition by using a last item stored in said first queue as said corresponding input transition.

11. The method of claim 10, further including compensating for the double counting of short circuit and charge/discharge energy in said generating an energy value when said corresponding input transition matches a second item stored in said second queue.

12. The method of claim 1 wherein said generating an energy value includes:

calculating an output load seen by said simulated logic transition; and calculating a slew rate for said simulated logic transition.

13. The method of claim 12, further including interpolating an energy value from at least two output load and slew rate pairs which bracket said output load and said slew rate, when said simple arc found in said searching which does not match said output load and said slew rate.

14. The method of claim 1 wherein said calculating further includes:

obtaining a net location and a cell instance corresponding to a cell having a boundary pin connected to said net location; and matching a cell power model to said cell instance.

15. A power evaluation tool for calculating the dynamic power dissipation of an electronic circuit design under simulation, comprising:

a receiver responsive to a simulated logic transition signal received from a simulator;

a first queue responsive to each simulated logic transition and direction that occurs at an input pin corresponding to a cell, said first queue having a two item capacity said first queue capable of storing items in first-in-first-out (FIFO) order;

a second FIFO queue responsive to each simulated logic transition and direction that occurs at a boundary pin corresponding to said cell, said second queue having a two item capacity, said second queue capable of storing items in FIFO order;

means for searching a power model for a simple arc that corresponds to said simulated logic transition, said power model corresponding to a cell instance which corresponds to the cell in which said simulated logic transition occurred; and means for generating an energy value using said simple arc.

16. The apparatus in claim 15, wherein said receiver is further responsive to input information, said input information including said power model, cell activity data, an electronic description of the electronic circuit design, and parasitic net capacitance values.

17. The apparatus in claim 16, wherein said cell activity data includes net transitions.

18. The apparatus in claim 15, wherein said means for searching includes a means for determining whether said simulated logic transition was the last transition to have occurred at said input pin.

19. The apparatus in 18, wherein said means for searching further includes means for comparing a second item stored in said first queue with a second item stored in said second queue.

20. The apparatus in claim 15, wherein said means for searching further includes means for determining whether said simulated logic transition was a last transition to have occurred at said output pin.

21. The apparatus in claim 20, wherein said means for searching searches for said simple arc in said power model having an output transition matching said simulated logic transition and a corresponding input transition.

22. The apparatus in claim 20, wherein said means for searching searches for said corresponding input transition by using a last item stored in said first queue as said corresponding input transition.

23. The apparatus in claim 22, further including means for compensating for the double counting of short circuit and charge/discharge energy when said corresponding input transition matches a second item stored in said second queque.

24. The apparatus in claim 15, wherein said means for generating an energy value includes means for calculating an output load seen by said simulated logic transition; and means for calculating a slew rate for said simulated logic transition.

25. The apparatus in claim 24, further including means for interpolating an energy value from at least two output load and slew rate pairs which bracket said output load and said slew rate, when a simple arc is found by said means for searching which does not match said output load and said slew rate.

26. A computer system, comprising:
a simulator for simulating an electronic circuit design;
a cell library containing power models corresponding to each cell instance used said electronic circuit design;
a power evaluation tool for calculating the dynamic power dissipation of said electronic circuit design, said power evaluation tool having:
an application program for execution by one or more processors provided by a computer under direction of an installed operating system program;
a first queue and second queue pair for each cell instance used in said electronic circuit design; said first queue for storing in a FIFO manner each transition and transition direction that occur at an input pin corresponding to said cell instance, said first queue responsive to said application program, and said second queue for storing in a FIFO manner each transition and transition direction that occur at every boundary pin corresponding to said cell instance, said second queue responsive to said application program;
a receiver responsive to each simulated logic transition signal resulting from the simulation of the electronic circuit;
means for searching one of said power models in said cell library for a simple arc that corresponds to said simulated logic transition, said one of said power models corresponding to a cell instance which corresponds to the cell in which said simulated logic transition occurred; and
means for generating an energy value using said simple arc.

27. The system in claim 26, wherein said receiver is further responsive to input information, said input information including said power model, cell activity data, an electronic description of the electronic circuit design, and parasitic net capacitance values.

28. The system in claim 27, wherein said cell activity data includes net transitions.

29. The system in claim 26, wherein said means for searching includes a means for determining whether said simulated logic transition was the last transition to have occurred at said input pin.

30. The system in 29, wherein said means for searching further includes means for comparing a second item stored in said first queue with a second item stored in said second queue.

31. The system in claim 26, wherein said means for searching further includes means for determining whether said simulated logic transition was a last transition to have occurred at said output pin.

32. The system in claim 31, wherein said means for searching searches for said simple arc in said power model having an output transition matching said simulated logic transition and a corresponding input transition.

33. The system in claim 31, wherein said means for searching searches for said corresponding input transition by using a last item stored in said first queue as said corresponding input transition.

34. The system in claim 33, further including means for compensating for the double counting of short circuit and charge/discharge energy when said corresponding input transition matches a second item stored in said second queue.

35. The system in claim 26, wherein said means for generating an energy value includes means for calculating an output load seen by said simulated logic transition; and means for calculating a slew rate for said simulated logic transition.

36. The system in claim 35, further including means for interpolating an energy value from at least two output load and slew rate pairs which bracket said output load and said slew rate, when a simple arc is found by said means for searching which does not match said output load and said slew rate.

37. A program storage device readable by a machine, embodying a program of instructions executable by the machine to perform a method to evaluate power dissipation of an electronic circuit design having at least one cell, the method comprising:
receiving input information descriptive of the electronic circuit design, said input information including a power model for each cell instance used in the electronic circuit design;
simulating the electronic circuit design so as to generate a simulated logic transition within the at least one cell;
storing said simulated logic transition in a first-in-first-out (FIFO) manner in a first queue and a second queue, if said simulated logic transition occurs at an input pin of one of the cells used in the electronic circuit design;
storing said simulated logic transition in a FIFO manner in said second queue, if said simulated logic transition occurs at an output pin of one of the cells used in the electronic circuit design;
searching a power model for a simple arc that corresponds to said simulated logic transition, said power model corresponding to a cell instance which corresponds to the cell in which said simulated logic transition occurred in said simulating; and
generating an energy value using said simple arc.

38. The program storage device of claim 37, further including calculating a power dissipation value using said energy value.

39. The program storage device of claim 37 wherein said simple arc obtained in said searching represents an event where said simulated logic transition occurred at an input pin and no corresponding transition occurred at any output pin of the cell.

40. The program storage device of claim 39, further including determining whether said simulated logic transition was the last transition to have occurred at said input pin.

41. The program storage device of claim 40 wherein said determining includes comparing a second item stored in said first queue with a second item stored in said second queue, wherein said items include logic transitions stored in said queues.

42. The program storage device of claim 37 wherein said simple arc obtained in said searching represents an event where said simulated logic transition occurred at an output pin and a corresponding prior transition occurred at an input pin of the cell.

43. The program storage device of claim 42, further including determining whether said simulated logic transition was a last transition to have occurred at said output pin.

44. The program storage device of claim 43 wherein said determining includes assuming said simulated logic transition as said last transition to have occurred at said output pin if a last item stored in said second queue is an output transition.

45. The program storage device of claim 44 wherein said generating includes finding said simple arc in said power model having an output transition matching said simulated logic transition and a corresponding input transition.

46. The program storage device of claim 44 wherein said generating includes finding said corresponding input transition by using a last item stored in said first queue as said corresponding input transition.

47. The program storage device of claim 46, further including compensating for the double counting of short circuit and charge/discharge energy in said generating an energy value when said corresponding input transition matches a second item stored in said second queue.

48. The program storage device of claim 37 wherein said generating an energy value includes:

calculating an output load seen by said simulated logic transition; and calculating a slew rate for said simulated logic transition.

49. The program storage device of claim 48, further including interpolating an energy value from at least two output load and slew rate pairs which bracket said output load and said slew rate, when said simple arc found in said searching which does not match said output load and said slew rate.

50. The program storage device of claim 37 wherein said calculating further includes:

obtaining a net location and a cell instance corresponding to a cell having a boundary pin connected to said net location; and matching a cell power model to said cell instance.

* * * * *

UNITED STATES PATENT AND TRADEMARK OFFICE
CERTIFICATE OF CORRECTION

PATENT NO. : 6,212,665 B1
DATED : April 3, 2001
INVENTOR(S) : Amir M. Zarkesh, Haizhou Chen It is certified that error appears in the above-identified patent and that said Letters Patent is hereby corrected as shown below:

Column 2,
Line 21, replace " $E = 1/2 * C * Vdd$ " with -- $E = 1/2 * C * Vdd^2$ --.
Line 24, replace "f" with -- $f$ --.
Line 26, replace " $P = f*[1/2 * C * Vdd]$." with -- $P = f*[1/2 * C * Vdd^2]$. --.
Line 28, replace "f" with -- $f$ --.
Line 29, replace "f_eff" with -- $f\_eff$ --.
Line 31, replace "act" with -- $act$ --.
Line 32, replace "f_eff=f*act" with -- $f\_eff=f*act$ --.
Line 59, replace "f_eff" with -- $f\_eff$ --.

Column 14,
Line 11, replace "cell;" with -- cell --.
Line 57, after "Scenario." insert a new paragraph.

Column 12,
Line 62, delete "of".
Line 67, replace "transition ,and" with -- transition, and --.

Column 14,
Line 11, replace "cell;" with -- cell --.

Column 15,
Line 9, delete "have occurred".

UNITED STATES PATENT AND TRADEMARK OFFICE
CERTIFICATE OF CORRECTION

PATENT NO. : 6,212,665 B1
DATED : April 3, 2001
INVENTOR(S) : Amir M. Zarkesh, Haizhou Chen It is certified that error appears in the above-identified patent and that said Letters Patent is hereby corrected as shown below:

<u>Column 19,</u>
Line 22, after "design;" insert -- and --.
Line 26, insert an indent before "an application".
Line 30, insert an indent before "a first queue".
Line 40, insert an indent before "a receiver".
Line 43, insert an indent before "means for".
Line 49, insert an indent before "means for".

Signed and Sealed this

Twenty-sixth Day of February, 2002

*Attest:*

*Attesting Officer*

JAMES E. ROGAN
*Director of the United States Patent and Trademark Office*